Dec. 27, 1966   E. L. BARRETT   3,294,589
DEFERRED ACTION TYPE OF DRY CELL BATTERY
Filed May 27, 1963   2 Sheets-Sheet 1

INVENTOR.
Edward L. Barrett
BY
Snow and Benno
Attys.

Dec. 27, 1966  E. L. BARRETT  3,294,589
DEFERRED ACTION TYPE OF DRY CELL BATTERY
Filed May 27, 1963  2 Sheets-Sheet 2

INVENTOR.
Edward L. Barrett
BY
Snow and Benno
Attys

United States Patent Office 3,294,589
Patented Dec. 27, 1966

3,294,589
DEFERRED ACTION TYPE OF DRY CELL BATTERY
Edward L. Barrett, La Grange Park, Ill., assignor of one-half to Kenneth T. Snow and Edward L. Benno, Chicago, Ill.
Filed May 27, 1963, Ser. No. 283,273
8 Claims. (Cl. 136—90)

This invention relates generally to primary batteries, and more particularly to primary batteries of the dry cell type which are relatively small, such as the commonly known D size dry cell.

The primary object of the present invention is to provide a novel arrangement for a dry cell which will permit the dry cell to be stored for relatively long periods of time without appreciable deterioration.

It is a further object to provide a novel dry cell construction in which the dry cell is initially assembled in a relatively inactive condition and which, prior to use, is activated.

It is a further object to provide a novel dry cell construction according to the preceding paragraph wherein the dry cell in the storage or shelf condition is substantially protected against any accidental activation.

It is still another object to provide a novel dry cell construction in accordance with the preceding paragraph in which the means for activating the dry cell is self-contained when the dry cell is in the storage or shelf condition.

It is still another object to provide a novel dry cell construction which may be stored in an inactive condition and activated prior to use and in which the chemical carrying interior portion of the battery is sealed against the leakage of any fluid therefrom in both the inactive and active conditions thereof.

It is still another object to provide a novel dry cell construction which is inactive in the shelf condition and which is activated prior to use, and which in both the inactive and active conditions is of a rugged construction capable of absorbing physical abuse and rough handling without substantially affecting the efficiency or output of the cell.

Other objects and features of the invention will be apparent upon a perusal of the following specification and drawing in which.

Figure 2:
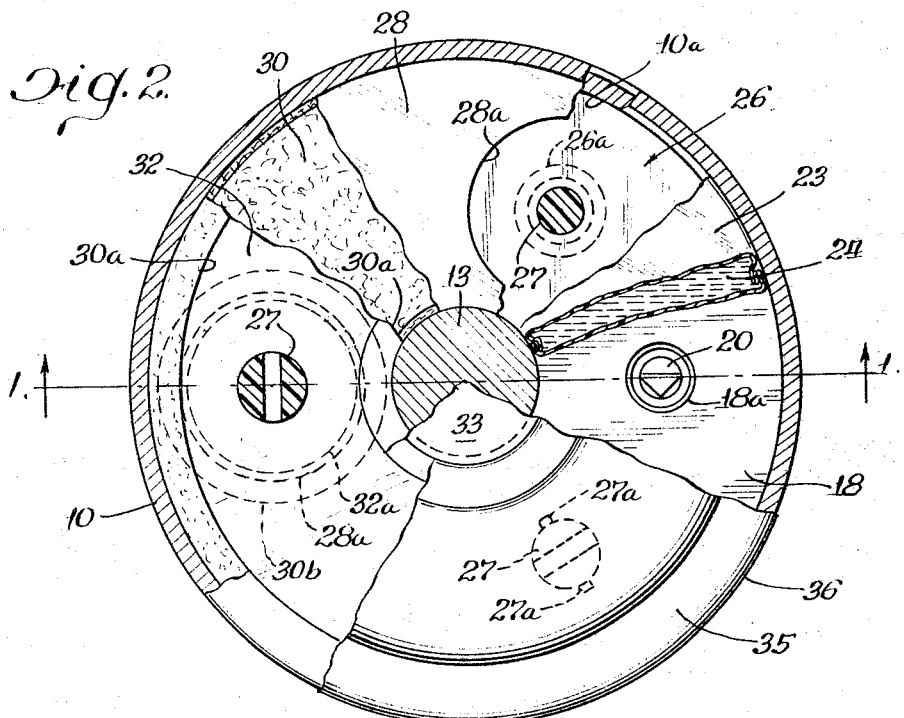
FIGURE 2 is a top plan view of a dry cell constructed in accordance with FIGURE 1 and with different portions of the structure cut away to disclose the interior arrangements.

The present embodiment is the preferred embodiment, but it is to be understood that changes can be made in the present embodiment by one skilled in the art without departing from the spirit and the scope of the present invention. It is especially contemplated that, although certain materials, chemicals or fluids are mentioned in the hereinafter following description, those materials, chemicals and fluids are by way of example only, and other types of materials, chemicals and fluids may be easily substituted therefor by one skilled in the art.

Generally, the dry cell construction of the present invention comprises an outer container forming one terminal of the cell, a center bar or rod forming the other terminal of the cell, and a porous medium carried within the container and about the center rod. The upper end of the container is sealed, and the porous medium terminates at a certain position spaced below the upper end of the container. The porous medium within the container is conventionally surrounded by a relatively porous fiber board which separates the porous medium from direct contact with the inner walls of the container. An annular member or washer is disposed in the container on top of a pair of porous fiber washers. The annular washer is provided with a plurality of holes therethrough and a small lance cup is carried in each of those holes. In the present embodiment, two diametrically opposed lance cups are shown, but it should be understood that the number may be varied, it merely being necessary that whatever arrangement of holes and lance cups is used, those holes should provide for a relatively uniform distribution of any fluid passing through those holes into and through the porous medium therebelow. An annular somewhat doughnut shaped plastic bag is carried in the container above the washer which carries the lance cups. The plastic bag is filled with a fluid. The present invention contemplates that the combination of the porous medium, the container, and the center rod be formed of various materials which in that combination do not provide an active dry cell, but which further requires that the fluid in the plastic bag be dispersed throughout the porous medium to define an active dry cell. Depending on the particular chemicals and materials selected for the outer container, the porous medium, and the center rod, the fluid in the plastic bag may be a liquid such as distilled water or a conventional solution of zinc chloride and sal ammoniac. An annular piston washer is carried in the container immediately above the plastic bag, and a plurality of pins, slidably carried through the top seal of the container, are connected at their lower ends to the piston washer. In the present embodiment of the invention, three pins are shown; however, it is contemplated that the number of pins may be varied, it merely being necessary to consider that whatever number of pins is used, manual downward pressure exerted on the pins must cause the piston washer to be moved downwardly against the plastic bag without any canting of the piston washer. The pins are so constructed that when the pins are substantially completely depressed through the top seal of the container, the pins will lock in that depressed position. As the pins are initially manually depressed, the plastic bag will bulge into the openings carrying the lance cups, and the lance cups will puncture the plastic bag to thereby permit the fluid within the plastic bag to flow through the lance cup openings and downwardly into the porous medium as the pins are further and completely depressed to completely empty the plastic bag of its fluid. The top seal of the container includes a relatively flexible sealing material which is formed as a bellows about each of the pins. The lower end of each bellows is sealed about the lower end of the pin which it encircles. This arrangement provides that in the activated condition of the dry cell, with the pins completely depressed, no fluid may escape from the dry cell through the openings in the top seal which carry the pins.

In the shelf condition of the dry cell, wherein the pins project upwardly from the top seal of the container, the pins are protected against any accidental downward movement by an annular cap member which is carried over the upwardly extending portions of the pins and is secured to the top of the dry cell by a length of tape which is circumferentially secured about the upper end of the container and the cap member. From the foregoing it may be seen that in the shelf condition of the dry cell, it may be roughly handled with substantially no danger of accidental activation thereof and with susbtantially no danger of leakage of the fluid from the dry cell.

Figure 3:
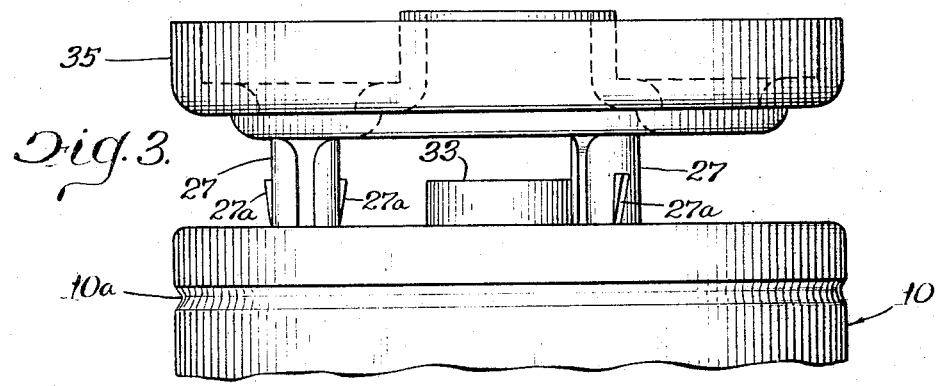
FIGURE 3 is a partial side elevational view of a dry cell constructed according to the invention and showing the arrangement of parts preparatory to manual activation.

The dry cell is activated by manually removing and discarding the tape securing the cap member over the top of the dry cell. The cap member is then manually turned over and positioned against the upper ends of the pins in a manner such as shown in FIGURE 3. The cap member thereby becomes a tool for manually simultaneously depressing the pins to cause the rupture of and forcing of fluid from the plastic bag to activate the dry cell. When the pins are locked in their depressed positions, the cap member may be discarded and the dry cell is ready for use in an active condition. In the active condition of the dry cell, the dry cell will absorb substantial physical abuse or rough handling with substantially no danger of misplacement or relative movement of the various internal parts of the dry cell to disturb the necessary cooperation between the parts thereof for the efficient production and maintenance of an electromotive force between the terminals thereof. In the active condition of the dry cell the dry cell is completely sealed against the leakage of any fluid therefrom.

The hereinafter following detailed description of the invention will proceed substantially in the steps in which the dry cell is constructed and assembled so that the reasons for the construction and arrangement of the various parts thereof may be more readily understood. The outer container 10 which forms one terminal of the dry cell may be made of a material such as zinc and is formed as a cylindrical container having an integral bottom wall and being open at the top thereof. A circular disk liner 11 formed of a porous fiber material such as cardboard is inserted in the container or shell 10 against the bottom wall thereof. A cylindrical liner 12 also formed of a porous type of material is next inserted in the shell 10. The upper end of the liner 12 terminates a certain distance below the upper end of the shell 10. A rod 13 which forms the other terminal of the dry cell is inserted in the center of the shell 10 to extend longitudinally thereof. The rod 13 may be formed of a material such as carbon, and the upper end of the rod 13 extends above the upper end of the shell 10. The space above the member 11, within the liner 12, and about the rod 13 is filled with a porous medium (depolarizer mix) which requires the addition of some fluid thereto before an electromotive force will be developed between the two terminals of the dry cell. The porous medium is indicated at 14, and may for example comprise a mixture of ground carbon and manganese dioxide. It should be understood that the spaces between the mixture or elements of the medium 14 are occupied by air or some other suitable gas at normal atmospheric pressures. The upper surface of the porous medium 14 is covered by a pair of flat annular washers 15 and 16. The washers 15 and 16 are formed of a porous material, and may be formed of a material such as Viskon.

On top of the washers 15 and 16, an annular washer 18 is disposed. The washer 18 is partially shown in plan view in FIGURE 2. FIGURE 2 is a top view showing progressively cut away portions of the various parts of the dry cell proceeding downwardly through the dry cell in a clockwise direction from a portion of the cap member, or the progressive stacking of the various parts proceeding in a counterclockwise direction from the washer 18. The washer 18 may be formed of a plastic material such as Styrofoam, and is provided with a plurality of holes 18a. In the present embodiment two holes 18a are provided, and those two holes 18a are positioned through the washer 18 in a diametrically spaced apart relationship. If three holes are used it should be understood that the spacing between the holes 18a should be equal or in other words the holes should preferably be 120 degrees apart. If four holes were used the spacing between holes would preferably be 90 degrees. The holes 18a are provided for receiving and securely carrying the lance cups 20 and for providing passageways through which the necessary fluid for activiating the dry cell may be admitted.

Figure 1:
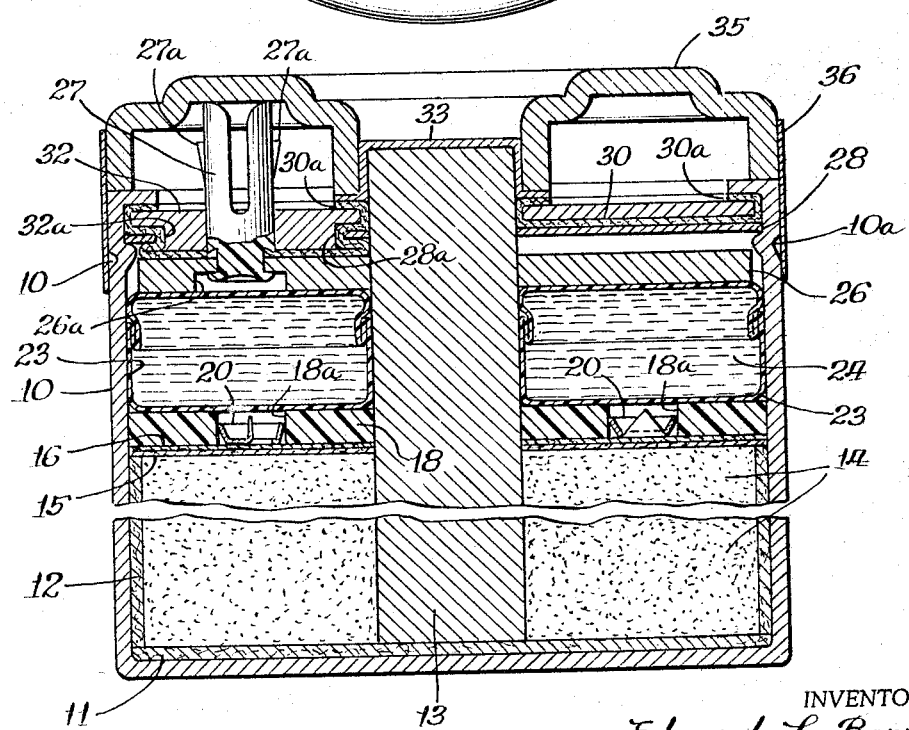
FIGURE 1 is a vertical cross-sectional view of a dry cell constructed according to the invention and taken substantially along the line 1—1 of FIGURE 2.
Figure 4:
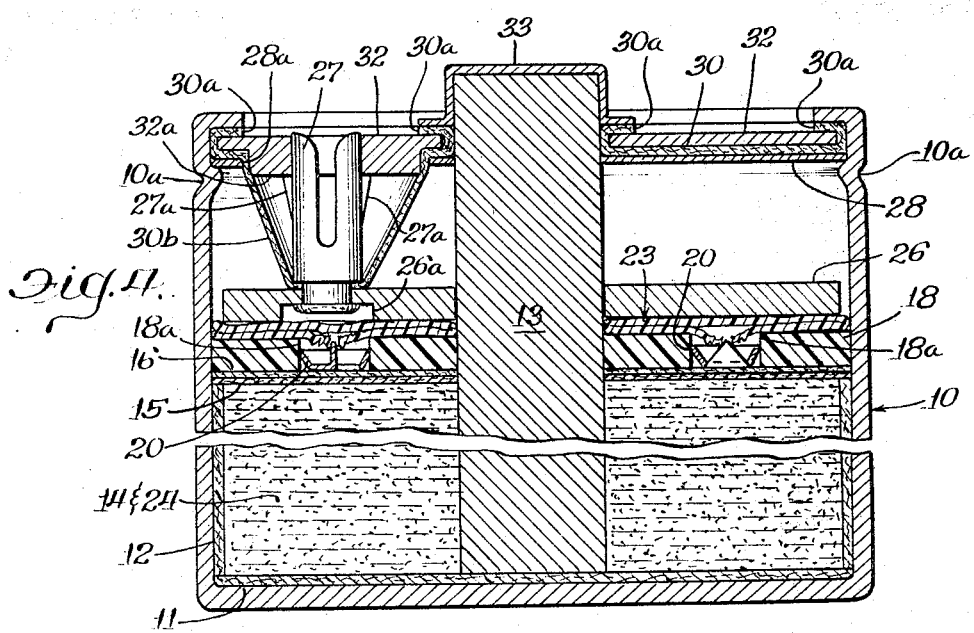
FIGURE 4 is a cross-sectional view similar to FIGURE 1 but showing the dry cell in the activated condition.
Figure 6:
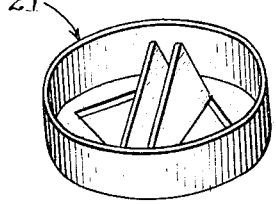
FIGURE 6 is an enlarged isometric view of a variation in the construction of the lance cup used in the cell construction of the present invention.

The lance cups 20, as shown in FIGURES 1, 2, and 4, comprise a dish shaped member in which a triangular flap from the bottom wall thereof has been upturned to extend upwardly as a relatively sharp point. When the lance cups 20 are properly positioned in the openings 18a, the upper end of the sharp point of each lance cup 20 is disposed slightly below the upper surface of the washer 18. The lance cups 20 may be formed of any material which is chemically inert to the active materials of the dry cell. A variation in the formation of the lance cups 20 is shown by the lance cup 21 in FIGURE 6, in which two flaps of the bottom wall of the lance cup have been upturned to provide two upwardly projecting relatively sharp points or tongs with a major portion of the bottom wall of the lance cup 21 being opened to thereby provide for the easy flow of the dry cell activating fluid through the bottom wall of the lance cup 21.

Figure 5:
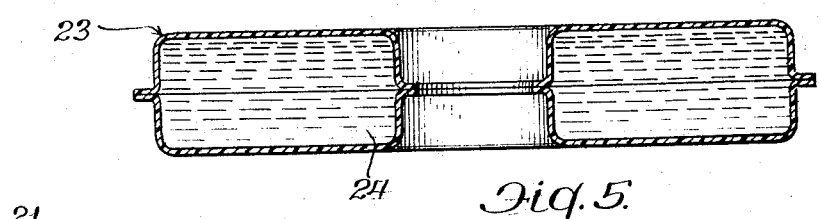
FIGURE 5 is a cross-sectional view of the fluid carrying envelope or sack which forms a part of the cell construction of the present invention.

On top of the washer 18, a plastic bag 23 is positioned. The plastic bag 23 is filled with a suitable fluid 24 which when released through the openings 18a of the washer 18 and through the open bottom walls of the lance cups 20 will displace the air in the porous medium 14 and infiltrate the porous medium 14 to form an electrolyte to activate the dry cell and cause an electromotive force to be generated between the terminals 10 and 13. With the example materials noted in the foregoing description, the fluid 24 may be a liquid which is a solution of zinc chloride and sal ammoniac. The plastic bag 23 is annular in shape and may be formed by two identical halves which are ring sealed together such as shown in FIGURE 5. The material of the plastic bag 23 may be such as Polyethylene. The bag 23 may be filled with the fluid 24 by means of a needle inserted through a needle opening in the bag 23, with the needle opening being sealed upon the complete filling thereof.

The upper side of the bag 23 is engaged by an annular piston washer 26. The piston washer 26 may be formed of any suitable relatively rigid material which is chemically inert to the active materials of the dry cell. The piston washer 26 in the present embodiment is provided with three shouldered holes 26a formed therethrough in a spaced apart relationship to each other. Three holes are provided because three pins 27 are used in the present embodiment to manually depress the piston washer 26 against the plastic bag 23. The manner in which the pins 27 are formed and connected to the piston washer 26 will be described below.

Immediately above the upper surface of the piston washer 26, the shell 10 is circumferentially indented at 10a to provide an inwardly extending shoulder about the inner wall of the shell 10.

The next member is an annular relatively flat and thin seat member 28 which at its outer periphery rests upon the inwardly extending shoulder of the shell 10. In the present embodiment, the seat member 28 is provided with three spaced apart openings 28a which are in axial alignment with the shouldered holes 26a of the piston washer 26. The seat member 28 may be formed of any relatively rigid material which is substantially chemically inert to the active materials of the dry cell.

The next member of the dry cell of the present invention is a seal member or membrane 30 which is formed of a relatively flexible material which is impervious to the fluid within the dry cell. For the major portion of its surface, the sealing member 30 rests upon the seat member 28, and the side marginal edges of the sealing member 30 are provided with upwardly extending flange portions 30a. The portions of the sealing member 30 in the area of the openings 28a through the seat member 28 are provided with bellows portions 30b which extend through the openings 28a of the seat member 28. In the shelf condition of the dry cell, the bellows 30b are folded back against the underside of the seat member 28 about the openings 28a. The center of each bellows portion 30b of the sealing member 30 is provided with an opening which will admit the lower shank portion of each pin 27. The lower shank portion of each pin 27 is reduced in diameter and the radially outwardly extending shoulder at the upper end of each reduced portion is provided with a sharp edge which will firmly grip the peripheral portions of the bellows portions 30b of the sealing member 30 when the reduced diameter portion of each pin 27 is inserted through one of the holes through the bellows portions 30b. The lower reduced diameter portion of each pin 27 is further inserted into one of the shouldered holes 26a of the seat member 26, and the lower end of each pin 27 is then upset to secure and seal each bellows portion 30b about the hole therethrough to the upper side of the seat member 26.

The next member in the construction is an annular cell top member 32 which is positioned in the upper end of the shell 10 and between the side flange portions 30a of the sealing member 30. The flange portions 30a are turned over the upper surface of the cell top member 32 at the outer and inner peripheries thereof, and the upper marginal edge of the shell 10 is turned down over the outer flange portion 30a to securely seal the dry cell about the outer periphery of the cell top member 32. It may be seen that the outer flange portion 30a of the sealing member 30 is compressed between the turned upper edge of the shell 10, the cell top member 30 and the seat member 28. The inner periphery of the cell top member 32 is effectively sealed by the turned over inner flange portion 30a of the sealing member 30 and the terminal cap 33 which is secured over the upper projecting end of the rod 13. In the present embodiment the cell top member 32 is provided with three holes therethrough which are in axial alignment with bellows portions 30b and the shouldered holes 26a. These holes permit the three pins 27 to extend upwardly therethrough. The underside of the cell top member 32 in the area of each opening therethrough is provided with a circular boss portion 32a which extends downwardly through the opening 28a in the seat member 28 to engage the upper side of the folded bellows portion 30b of the sealing member 30. The depth of the three boss portions 32a provides a secure arrangement of the various parts of the cell so that the piston washer 26 is firmly held against the upper side of the plastic bag 23.

The upper end portion of each pin 27 is bifurcated or split to permit the split portions of each pin 27 to be compressed together. Each of the pins 27 is formed of a material having some resiliency so that after the split ends of each pin are released, the split ends will assume the spaced apart position as shown in the drawings. The outer surface of each split end portion of each pin 27 is provided with an integrally formed locking wing 27a. This construction of the pins 27 provides that when the pins 27 are depressed through the openings in the cell top member 32, the pins 27 will be locked in their depressed positions by the locking wings 27a in a manner such as shown in FIGURE 4. The pins 27 may be formed of materials such as nylon or Delrin.

The dry cell of the subject invention in the shelf condition further includes a cap 35 and a length of tape 36. The cap 35 is annular in shape with depending inner and outer walls. The inner walls of the cap 35 define an opening of the diameter of the terminal cap 33, and the outer walls of the cap 35 have a diameter substantially equal to the outer diameter of the shell 10. When the cap 35 is placed on the upper end of the dry cell, the upper ends of the pins 27 will engage the underside of the cap 35 as shown in FIGURE 1. The length of tape 36, which may be a pressure sensitive tape, is secured about the outer depending wall of the cap 35 and the upper end of the shell 10 to hold the cap 35 securely over the upper end of the dry cell. The foregoing description completes the construction details of the dry cell of the present invention in the shelf condition thereof.

When the dry cell is to be activated, the length of tape 36 is removed therefrom, and the cap 35 is overturned and held in a position such as shown in FIGURE 3 against the upper ends of the pins 27. The pins 27 are then manually depressed by manual pressure on the cap 35. The initial depression of the pins 27 will cause the plastic bag 23 to bulge into the openings 18a of the washer 18 and the plastic bag 23 will be punctured by the projecting sharp points of the lance cups 20. Further depression of the pins 27 will move the piston washer 26 downwardly against the plastic bag 23 to collapse the plastic bag 23 as the fluid 24 from the bag 23 is forced downwardly through the lance cup openings and the porous washers 15 and 16 into and throughout the porous medium 14. In the completely depressed position of the pins 27, the locking wings 27a will lock the pins 27 against any upward movement, and the piston washer 26 will be in its downwardmost position such as shown in FIGURE 4 with the plastic bag 23 in a completely collapsed condition. The downward movement of the pins 27 and the piston washer 26 will cause the bellows portions 30b of the sealing member 30 to be extended in a cone shape such as shown in FIGURE 4. The sealing member 30 will thereby continue to maintain the dry cell in a completely sealed condition in the activated condition thereof. It may be seen from the drawings that as fluid 24 displaces air in the porous medium 14, that air will be forced into the space above the piston washer 26 and below the seat member 28. With the activation of the dry cell, the cap 35 may be discarded and the dry cell is ready for use.

Having described the invention what is considered new and desired to be protected by Letters Patent is:

1. A dry cell battery comprising, a container comprising one terminal of said dry cell, the upper end of said container being open, a rod located in the center of said container to extend through the length thereof and comprising the other terminal of said dry cell, a depolarizer mix disposed in said container about said rod; said container, said rod and said depolarizer mix being formed to provide for the generation of an electromotive force between said terminals upon the dispersion of a certain fluid through said depolarizer mix to form an electrolyte, a flexible bag carried in said container above said depolarizer mix, said flexible bag containing said certain fluid in a sealed condition therein, lance means carried in said container above said depolarizer mix and below said flexible bag, a cell top member secured to the open upper end of said container and about said rod, piston means slidably carried in said container above said flexible bag and below said cell top member, said piston means including extended portions extending through said cell top member for manual pressure against said extended portions to press said bag against said lance means to cause said bag to be ruptured and said certain fluid to be forced therefrom and into said depolarizer mix, sealing means cooperating with said cell top member and with said piston means and sealing said dry cell against the leakage of any fluid therefrom after said certain fluid has been forced from said flexible bag, and locking means for locking said piston means in a depressed position after said certain fluid has been forced from said bag.

2. In a dry cell battery as defined in claim 1, and said piston means including said extended portions comprising a piston washer carried in said container about said rod and engaging the upper side of said bag, said flexible bag being annular in shape and carried about said rod, and said extended portions comprising pin means carried through said cell top member and connected to said piston washer so that said pin means is manually movable to press said piston washer against said bag to cause the rupture of said bag and for forcing said certain fluid into said depolarizer mix.

3. In a dry cell battery as defined in claim 2, an annular cap member disposed on top of said dry cell over said pin means, and a length of tape disposed circumferentially about said cap member and the upper end of said dry cell to secure said cap member thereon.

4. In a dry cell battery as defined in claim 3, wherein said tape is manually removable and said cap member is adapted to be overturned and manually applied against said pin means for moving said pin means to press said piston washer against said bag.

5. In a dry cell battery as defined in claim 2, said pin means comprising a plurality of pins journaled through openings in said cell top member about said rod, said plurality of pins connected at their lower ends to said piston washer, and said sealing means further comprising a sealing member secured between the inner and outer peripheral edges of said cell top member and the upper end of said container and said rod, said sealing member further including integrally formed bellows portions carried about the portions of said pins extending downwardly from said cell top member, said bellows portions being secured about the lower periphery of said pins so that said dry cell battery is sealed against the leakage of any fluids therefrom in any depressed position of said pins.

6. In a dry cell battery as defined in claim 5, said pins being formed of a material having some resiliency and the upper end portions of said pins being bifurcated, locking wings integrally formed on the outer surface of the bifurcated portions of said pins and cooperating with said cell top member so that the bifurcated portions of said pins are slightly closed when said pins are manually depressed through said cell top member and so that when said locking wings attain positions below said cell top member said bifurcated end portions of said pins regain their normal open positions to cause said pins to be locked in the depressed positions thereof.

7. In a dry cell battery as defined in claim 5, an annular cap member disposed on top of said dry cell over the portions of said pins extending upwardly from said cell top member, and a length of tape disposed circumferentially about said cap member and the upper end of said dry cell to secure said cap member thereon.

8. In a dry cell battery as defined in claim 7, wherein said tape is manually removable and said cap member is adapted to be overturned and manually applied against the extending ends of said pins for simultaneously depressing said plurality of pins through said cell top member to press said piston washer uniformly against the surface of said bag.

References Cited by the Examiner

UNITED STATES PATENTS

| | | | |
|---|---|---|---|
| 2,571,732 | 10/1951 | Lewis et al. | |
| 3,053,928 | 9/1962 | Hopkins | 136—90 |
| 3,139,356 | 6/1964 | Tsuji | 136—90 |
| 3,173,811 | 3/1965 | Amiet | 136—90 |

WINSTON A. DOUGLAS, *Primary Examiner.*

ALLEN B. CURTIS, B. J. OHLENDORF,
*Assistant Examiners.*